United States Patent
Kim et al.

(10) Patent No.: US 7,764,489 B2
(45) Date of Patent: Jul. 27, 2010

(54) MULTIMEDIA PORTABLE ELECTRONIC DEVICE

(75) Inventors: Sang-Kyun Kim, Seoul (KR);
Jong-Kwon Ko, Suwon-si (KR);
Young-Wook Sohn, Yongin-si (KR);
Sang-Il Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 86 days.

(21) Appl. No.: 12/119,839

(22) Filed: May 13, 2008

(65) Prior Publication Data
US 2008/0285215 A1    Nov. 20, 2008

(30) Foreign Application Priority Data
May 14, 2007    (KR)    ............... 10-2007-0046718

(51) Int. Cl.
    G06F 1/16    (2006.01)
    G06F 3/02    (2006.01)
    H04M 1/00    (2006.01)
    B41J 5/00    (2006.01)

(52) U.S. Cl. ..................... 361/679.16; 361/679.11; 361/679.55; 361/679.56; 345/168; 345/169; 455/575.1; 400/489

(58) Field of Classification Search ...............
    361/679.01–679.45, 679.55–679.59; 455/575.1, 455/575.3, 575.4; 345/156, 157, 168, 169, 345/162, 905; 400/489
    See application file for complete search history.

(56) References Cited

U.S. PATENT DOCUMENTS

| 5,543,787 | A  | * | 8/1996 | Karidis et al. ................. 341/20 |
| 6,798,649 | B1 |   | 9/2004 | Olodort |
| 6,856,406 | B2 |   | 2/2005 | Chase |
| 2003/0125094 | A1 | * | 7/2003 | Hyun et al. ................. 455/566 |
| 2005/0002158 | A1 | * | 1/2005 | Olodort et al. ............. 361/683 |
| 2005/0063144 | A1 |   | 3/2005 | Park |
| 2005/0258021 | A1 | * | 11/2005 | Liu et al. .................... 200/5 A |

FOREIGN PATENT DOCUMENTS

| JP | 08-190834 | 7/1996 |
| JP | 2006-235958 | 7/2006 |
| KR | 1020040044213 | 5/2004 |
| KR | 10-0452096 | 9/2004 |

\* cited by examiner

Primary Examiner—Jayprakash N Gandhi
Assistant Examiner—Nidhi Desai
(74) Attorney, Agent, or Firm—H.C. Park & Associates, PLC

(57) ABSTRACT

Disclosed is a multimedia portable electronic device including a first housing, a second housing coupled to the first housing so as to rotate about a first hinge axis, a third housing adapted to slide while facing the first housing, a fourth housing connected to the third housing so as to rotate about a second hinge axis to be folded/unfolded, a connection device positioned between the first and fourth housings so that the connection device rotates about a third hinge axis to slide the third housing when the fourth housing is folded on or unfolded from the third housing, and a sliding device positioned between the first and third housings so that the third housing can slide.

18 Claims, 13 Drawing Sheets

MULTIMEDIA PORTABLE ELECTRONIC DEVICE

CROSS REFERENCE TO RELATED APPLICATION

This application claims priority from and the benefit of Korean Patent Application No. 10-2007-0046718, filed on May 14, 2007, which is hereby incorporated by reference for all purposes as if fully set forth herein.

BACKGROUND OF THE INVENTION

1. Field of the Invention

The present invention relates to a multimedia portable electronic device, such as a DMB phone, a cellular phone, a PCS, a Personal Digital Assistant (PDA), or a Hand Held Phone (HHP).

2. Discussion of the Background

As generally known in the art, a portable electronic device is an electronic device carried by a user for wireless communication with a desired person. The wireless communication, for example, may be voice communication, message transmission, file transmission, video communication, camera functionality, etc. Such a portable electronic device can also act as a personal secretary, i.e. it can manage a person's telephone number book and schedule.

Portable electronic devices tend to be smaller, slimmer, easier to grip, and lighter for better portability. They are also evolving to provide a wider range of services (i.e. multimedia-oriented), and much emphasis is given to their entertainment contents (e.g. games).

Conventional portable electronic devices may be classified as bar-type devices or folder-type devices according to their appearance, more particularly, according to their portability and user convenience.

Folder-type portable electronic devices are disclosed in U.S. Pat. No. 6,856,406.

Portable electronic devices may also be classified as swing-type devices or sliding-type devices according to the manner in which they are opened/closed.

Sliding-type portable electronic devices are disclosed in detail in Korean Patent Application No. 10-2002-0071911, and swing-type portable electronic devices are disclosed in detail in U.S. patent application Ser. No. 10/822,380.

While conventional portable electronic devices may allow a user to conveniently input data or check displayed data in a phone mode for voice communication or message transmission, they cannot guarantee the same level of convenience in a multimedia-oriented environment.

This is because the display unit of conventional portable electronic devices may not have a wide screen, and the keypad may have a limited number of keys, which may make it difficult to input complicated data.

Current trends are moving toward more convenient data input/output devices.

Therefore, a portable electronic device having a data input/output device adapted to a new interfacing environment (e.g. portable Internet) is needed.

In addition, when the keypad of a conventional portable electronic device is folded/unfolded, components for rotating/sliding the terminal are exposed. This may degrade the aesthetic appearance of the portable electronic device. There is also concern that the user's finger may get stuck in the device and be injured when the terminal is rotated/slid.

SUMMARY OF THE INVENTION

The present invention provides a portable electronic device having a keyboard, a rotation of which is automatically followed by a sliding movement of another keyboard so that the resulting key arrangement may enable key operations with both hands and make it convenient to enjoy games or input data with both hands.

The present invention also provides a portable electronic device having a connection device that may be short enough to ensure an easy sliding movement of a keyboard, minimize the extent of exposure of the connection device, and prevent the user's fingers from being hurt during use.

The present invention also provides a portable electronic device having a sliding device adapted to semi-automatically move a keyboard that is not fully slid by a short connection device, which may otherwise open and slide the keyboard without using the sliding device, so that the product may be opened/closed easily.

Additional features of the invention will be set forth in the description which follows, and in part will be apparent from the description, or may be learned by practice of the invention.

The present invention discloses a multimedia portable electronic device including a first housing, a second housing coupled to the first housing so as to rotate about a first hinge axis, a third housing adapted to slide while facing the first housing, a fourth housing connected to the third housing so as to rotate about a second hinge axis to be folded/unfolded, a connection device positioned between the first and fourth housings such that the connection device rotates about a third hinge axis, thereby causing the third housing to slide when the fourth housing is folded on or unfolded from the third housing, and a sliding device positioned between the first and third housings so that the third housing can slide.

The present invention also discloses a multimedia portable electronic device including a first housing, a second housing connected to the first housing so as to rotate about a first hinge axis, a third housing adapted to slide while facing the first housing, and a fourth housing connected to the third housing by a second hinge unit and a connection device so that the fourth housing rotates about second and third hinge axes to be folded or unfolded and slides the third housing with the sliding device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
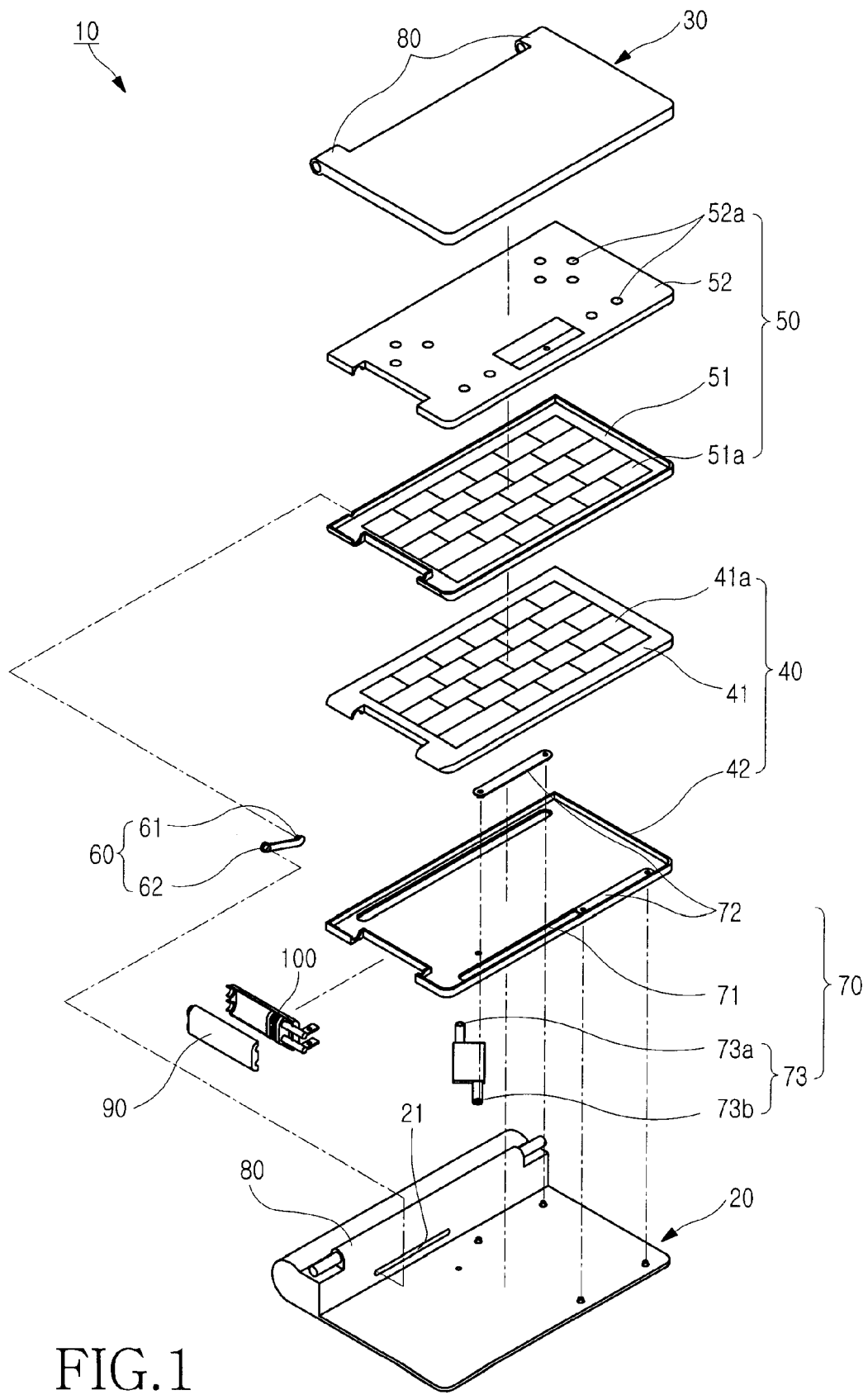
FIG. 1 is an exploded perspective view showing the construction of a multimedia portable electronic device according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Figure 2:
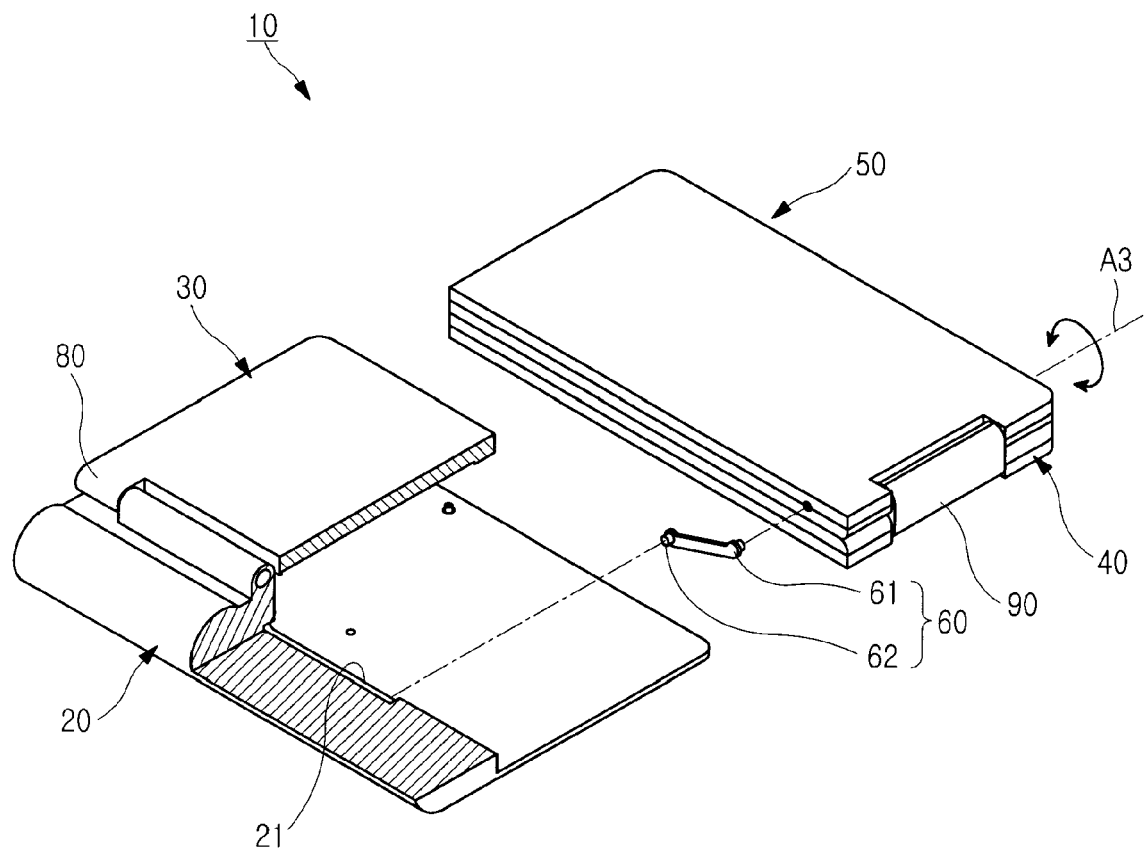
FIG. 2 is an exploded perspective view showing a connection device of a multimedia portable electronic device according to an exemplary embodiment of the present invention.
Figure 3:
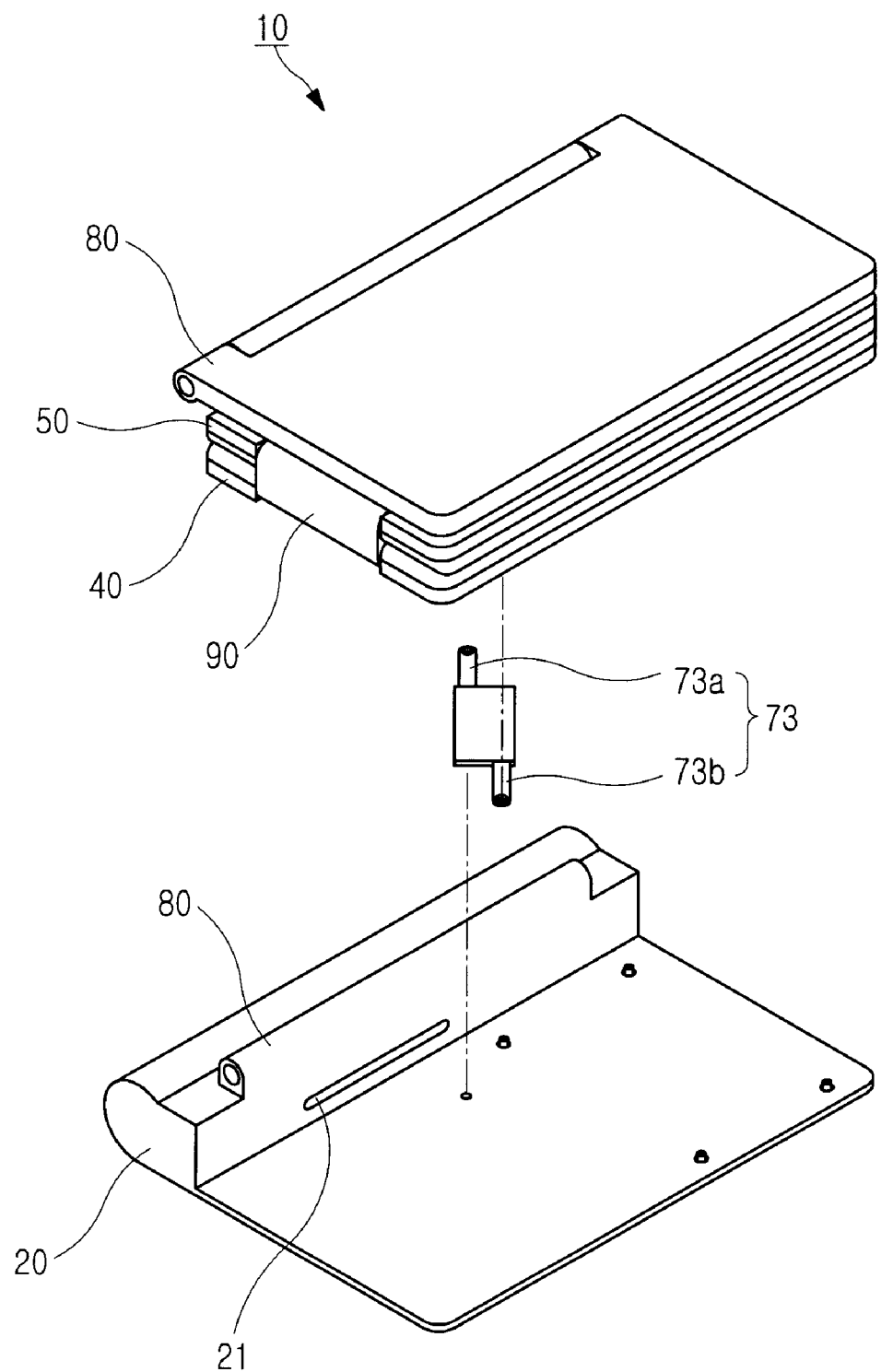
FIG. 3 is an exploded perspective view showing a sliding device of a multimedia portable electronic device according to an exemplary embodiment of the present invention.

As shown in FIG. 1, FIG. 2, and FIG. 3, a portable electronic device 10 includes first, second, third, and fourth housings 20, 30, 40, and 50, a connection device 60, and a sliding device 70. The first housing 20 extends in a longitudinal direction and connects to the second housing 30 so that it can rotate about a first hinge axis A1 of a first hinge unit 80 (described later). The first housing 20 can slide while facing the third housing 40. The second housing 30 extends in the longitudinal direction on the first housing 20 so as to rotate about the first hinge axis A1. The third housing 40 extends in the longitudinal direction on the first housing 20 so as to slide while facing the first housing 20. The fourth housing 50 extends in the longitudinal direction on the third housing 40 and connects to it so as to rotate about a second hinge axis A2 of a second hinge unit 90 (described later) to be folded/unfolded. The connection device 60 is positioned between the first and fourth housings 20 and 50 and guides the third housing 40 so that it can automatically slide when the fourth housing 50 rotates about a third hinge axis A3 to be folded/unfolded. The sliding device 70 is positioned between the first and third housings 20 and 40 so that the third housing 40 can slide semi-automatically.

As shown in FIG. 1, FIG. 4, FIG. 5, FIG. 8, and FIG. 11, the first hinge unit 80 defines a first hinge axis A1 extending in the longitudinal direction of the first and second housings 20 and 30. The first hinge unit 80 is positioned on the upper surface of the first housing 20 and on one side of the second housing 30 so that the second housing 30 can rotate toward or away from the first housing 20. The second hinge unit 90 defines a second hinge axis A2 extending in a direction perpendicular to the longitudinal direction. The second hinge unit 90 is positioned on one side of the third and fourth housings 40 and 50, respectively, so that the fourth housing 50 can rotate to be folded on/unfolded from the third housing 40.

Figure 4:
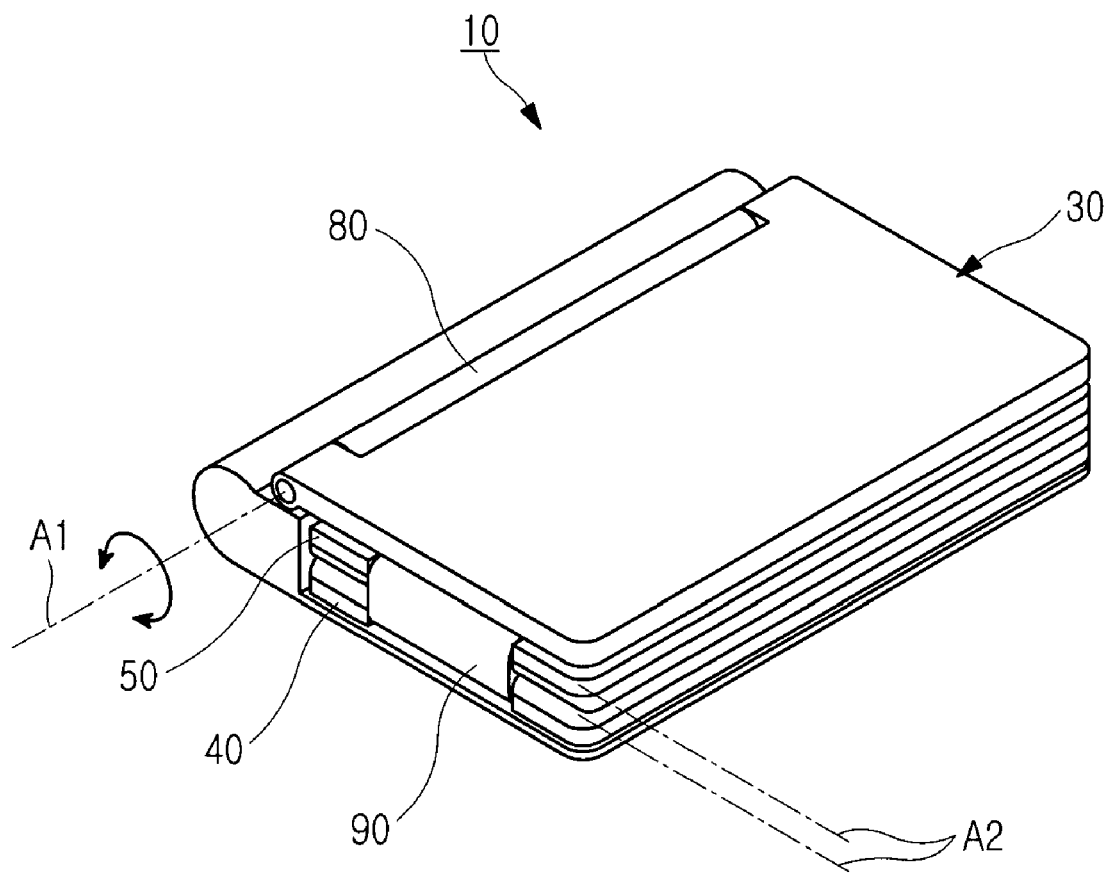
FIG. 4 is a perspective view showing an assembled multimedia portable electronic device according to an exemplary embodiment of the present invention.

As shown in FIG. 1 and FIG. 4, the second hinge unit 90 includes a dual-axis hinge member providing two hinge axes A2 so that the third and fourth housings 40 and 50 can rotate in an organized manner. The dual-hinge member is provided with a reduction unit 100 to reduce the speed of rotation of the fourth housing 50. The reduction unit 100 may include a number of meshing gears.

As shown in FIG. 1, FIG. 2, FIG. 8, FIG. 9, FIG. 10, and FIG. 11, one end 61 of the connection device 60 is coupled to the fourth housing 50 so that it can rotate together therewith when the fourth housing 50 is folded on/unfolded from the third housing 40. The other end 62 of the connection device 60 is coupled to a guide member 21 of the first housing 20 so that the third housing 40 slides when the fourth housing 50 rotates about the third hinge axis A3.

As shown in FIG. 1 and FIG. 2, the guide member 21 may be a guide movement hole, which the connection device 60 is coupled to and moves along.

As shown in FIG. 2, FIG. 11, FIG. 12, and FIG. 13, the connection device 60 provides a third hinge axis A3 extending parallel to the second hinge axis A2. The connection device 60 may be a link that can be easily coupled to the first and fourth housings 20 and 50 and mounted inside the first, second, third, and fourth housings 20, 30, 40, and 50, respectively.

Figure 5:
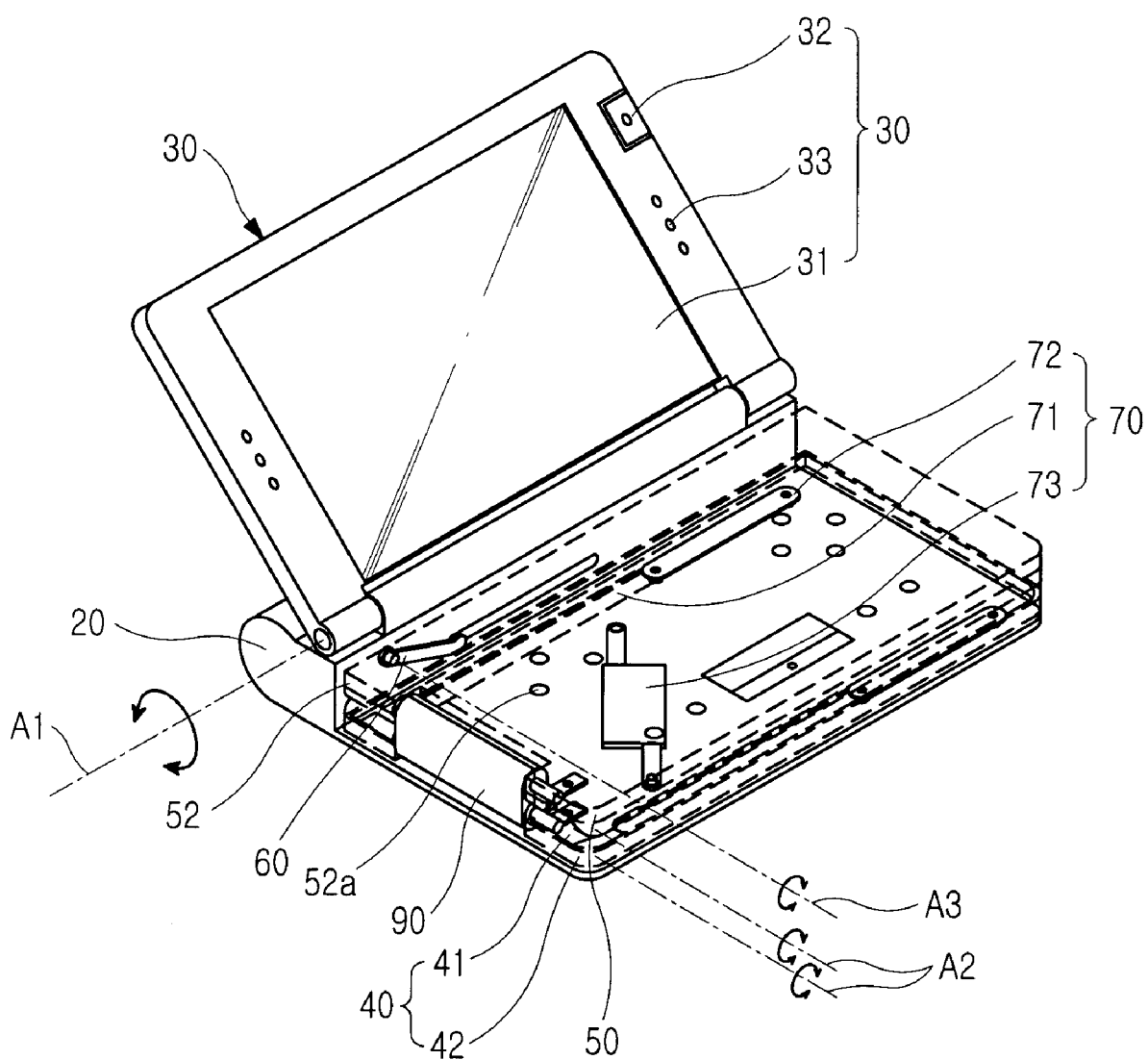
FIG. 5 is a perspective view showing a multimedia portable electronic device according to an exemplary embodiment of the present invention after a rotation of its second housing.
Figure 6:
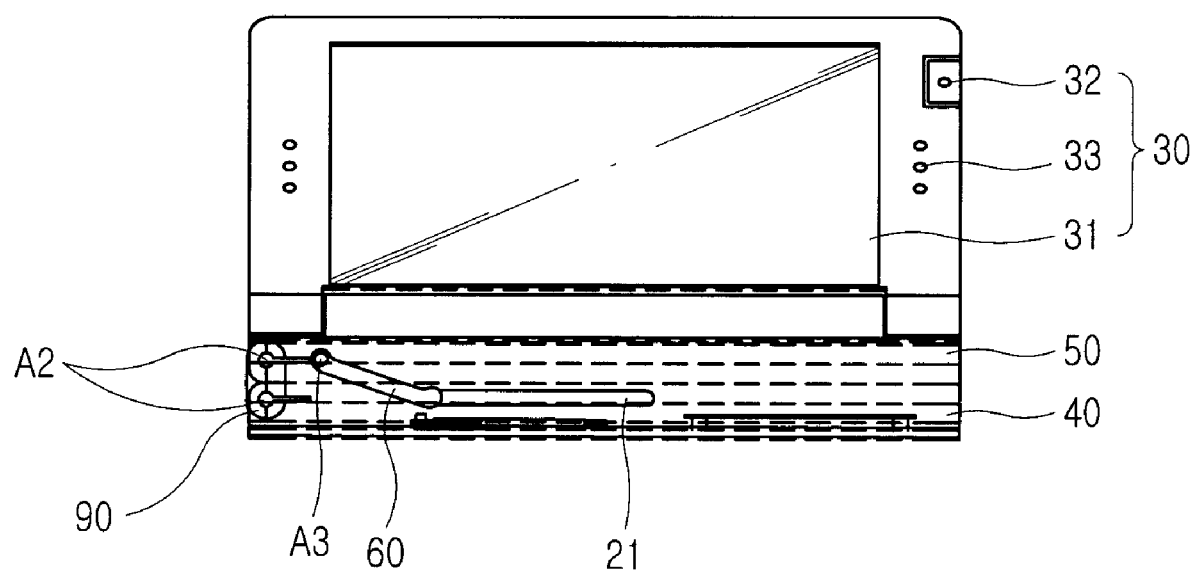
FIG. 6 is a front view showing a multimedia portable electronic device according to an exemplary embodiment of the present invention after a rotation of its second housing.

As shown in FIG. 5, the second housing 30 includes a display unit 31, a rotatable camera lens housing 32, and a speaker device 33. The display unit 31 is mounted on the inner surface of the second housing 30 so that it can rotate about the first hinge axis A1 to be exposed. The rotatable camera lens housing 32 is positioned adjacent to the display unit 31 so that it may be used when the portable electronic device 10 is in a camera mode. The speaker device 33 is positioned adjacent to the display unit 31.

As shown in FIG. 1 and FIG. 5, the third housing 40 includes first and second cases 41 and 42. The first case 41 includes a first keypad 41a having a number of keys arranged thereon so that they are exposed when the fourth housing 50 rotates about the second and third hinge axes A2 and A3. The second case 42 includes a pair of guide holes 71 that are fastened to a pair of guide fasteners 72 (described later), which are able to slide.

Figure 11:
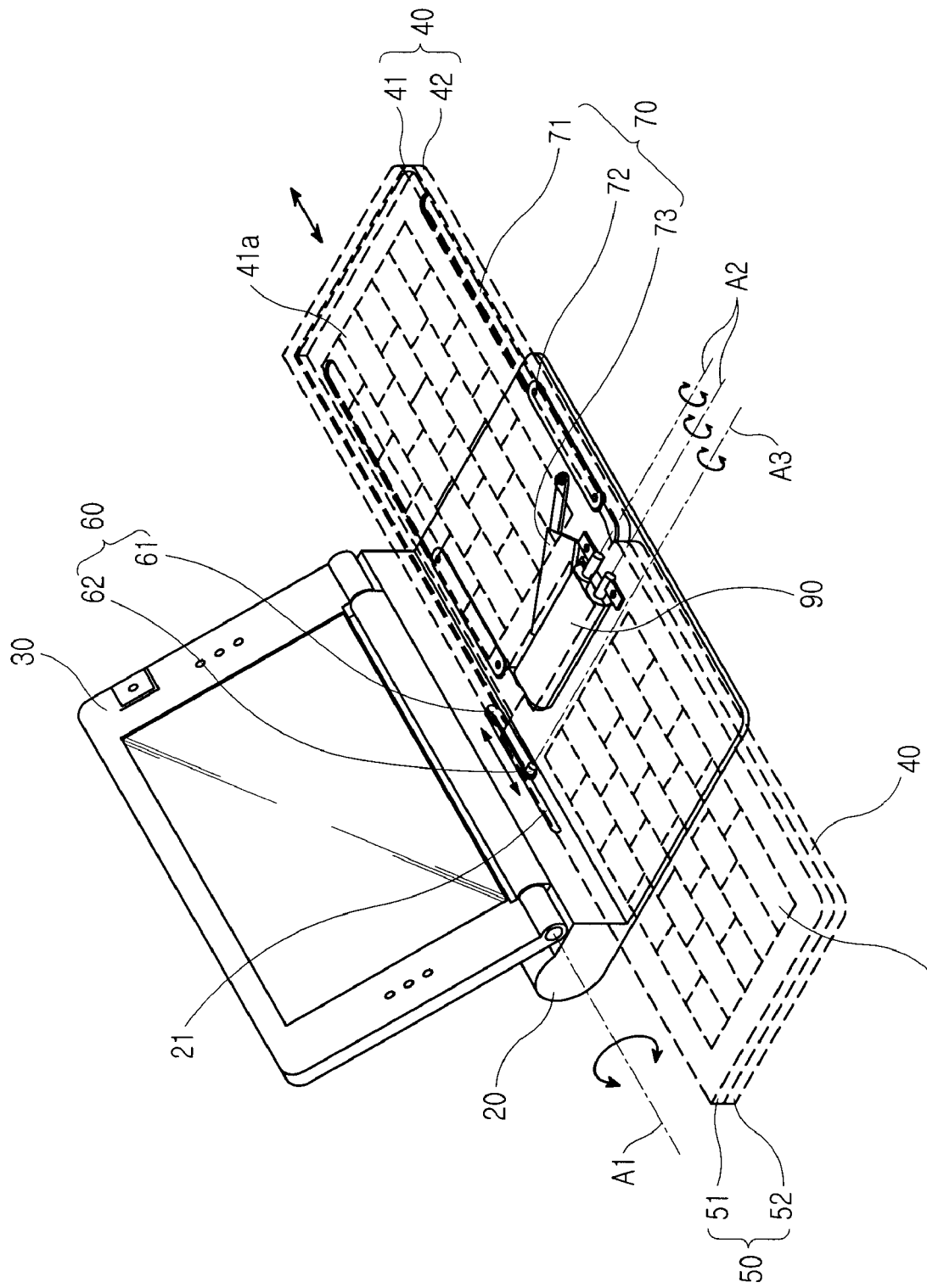
FIG. 11 is a perspective view showing the operating conditions of second, third, and fourth housings of a multimedia portable electronic device according to an exemplary embodiment of the present invention.

As shown in FIG. 1 and FIG. 11, the fourth housing 50 includes first and second cases 51 and 52. The first case 51 includes a second keypad 51a having a number of keys arranged thereon that are exposed when the fourth housing 50 rotates about the second and third hinge axes A2 and A3 to be unfolded. The second case 52 includes a third keypad 52a having a number of keys arranged thereon that are exposed when the second housing 30 rotates about the first hinge axis A1.

As shown in FIG. 1, FIG. 3, FIG. 8, FIG. 10, FIG. 11, and FIG. 13, the sliding device 70 includes a pair of guide holes 71, a pair of guide fasteners 72, and a force supply unit 73. The guide holes 71 in the third housing 40 are coupled to the guide fasteners 72 (described later), which are able to slide. The guide fasteners 72 are coupled to the first housing 20 and are inserted into the guide holes 71 to support the third housing 40 and guide its sliding movement. The force supply unit 73 is positioned between the first and third housings 20 and 40 and faces the first and third housings 20 and 40 in the transverse direction so that, when the third housing 40 slides more or less than a specific distance, it is provided with a force necessary for semi-automatic movement.

As shown in FIG. 3, FIG. 8, FIG. 9, FIG. 10, FIG. 11, FIG. 12, and FIG. 13, the force supply unit 73 includes a push rod 73. One end 73a of the push rod 73 is configured as a first push rod fastened to the upper portion of the first housing 20, and the other end 73b thereof is configured as a second push rod fastened to the third housing 40. When the first and second push rods 73a and 73b contract to the greatest extent during a sliding movement of the third housing 40, they are perpendicular to the sliding direction of the third housing 40 and, when the first and second push rods 73a and 73b extend to the greatest extent, they are at an oblique angle to the sliding direction of the third housing 40.

The operation of the portable electronic device 10 according to an exemplary embodiment of the present invention, which is constructed as mentioned above, will now be described in more detail with reference to FIG. 1, FIG. 2, FIG. 3, FIG. 4, FIG. 5, FIG. 6, FIG. 7, FIG. 8, FIG. 9, FIG. 10, FIG. 11, FIG. 12, and FIG. 13.

As shown in FIG. 1, FIG. 2, and FIG. 3, the portable electronic device 10 includes first, second, third, and fourth housings 20, 30, 40, and 50, a connection device 60, and a sliding device 70. The second housing 30 is rotatably connected to the first housing 20 by a first hinge unit 80. The third housing 30 includes first and second cases 41 and 42. A pair of guide fasteners 72 are inserted into a pair of guide holes 71 in the second case 42 so that the third housing 40 is coupled onto the first housing 20. The first housing 20 has a force supply unit 73 between itself and the second case 42. The force supply unit 73 may include a push rod. One end 73a of the push rod is fastened to the upper portion of the first housing 20, and the other end 73b is fastened to the second case 42 of the third housing 40.

The first case 41 of the third housing 40 is coupled to the second case 42 with the first keypad 41a formed thereon, as shown in FIG. 1. The fourth housing 50 is arranged on the upper surface of the third housing 40, and a second hinge unit 90 is rotatably coupled to one end of the third and fourth housings so that the fourth housing 50 can fold on/unfold from the third housing 40.

When the portable electronic device 10 is to be used in a game mode, the second housing 30 is rotated around the first hinge axis A1 away from the fourth housing 50, as shown in FIG. 4, FIG. 5, FIG. 6, and FIG. 7. This exposes the display unit 31 on the second housing 30, as well as the third keypad 52a on the second case 52 of the fourth housing 50.

The third keypad 52a may include game-related keys.

The user then can use the portable electronic device 10 in the game mode by using the display unit 31 and the third keypad 52a.

When the user wants to use the portable electronic device 10 in a QWERTY key mode, the fourth housing 50 is rotated about the second and third hinge axes A2 and A3 while the second housing 30 has been rotated, as shown in FIG. 8, FIG. 9, FIG. 10, FIG. 11, FIG. 12, and FIG. 13.

Figure 8:
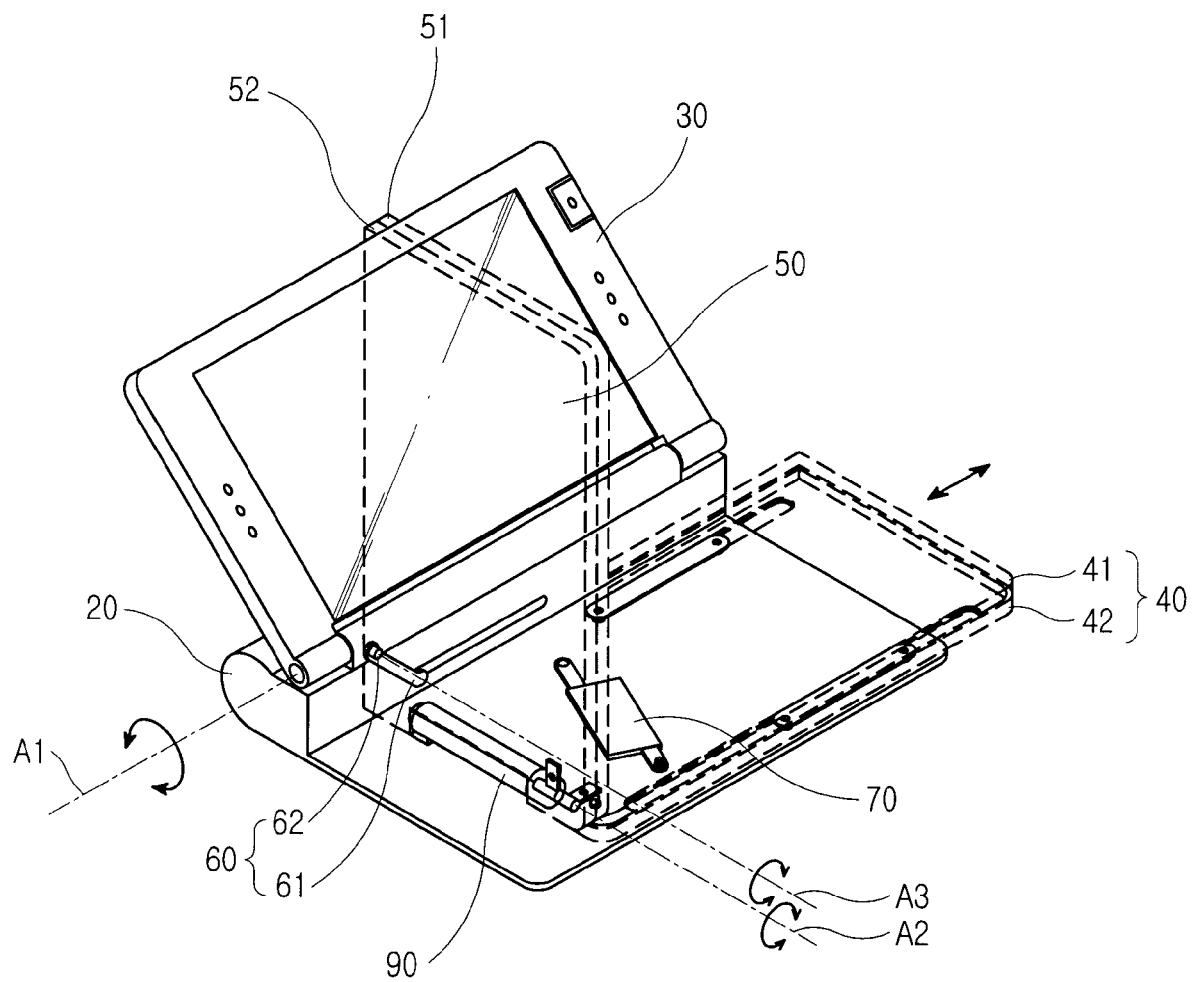
FIG. 8 is a perspective view showing the operating condition of third and fourth housings of a multimedia portable electronic device according to an exemplary embodiment of the present invention.
Figure 9:
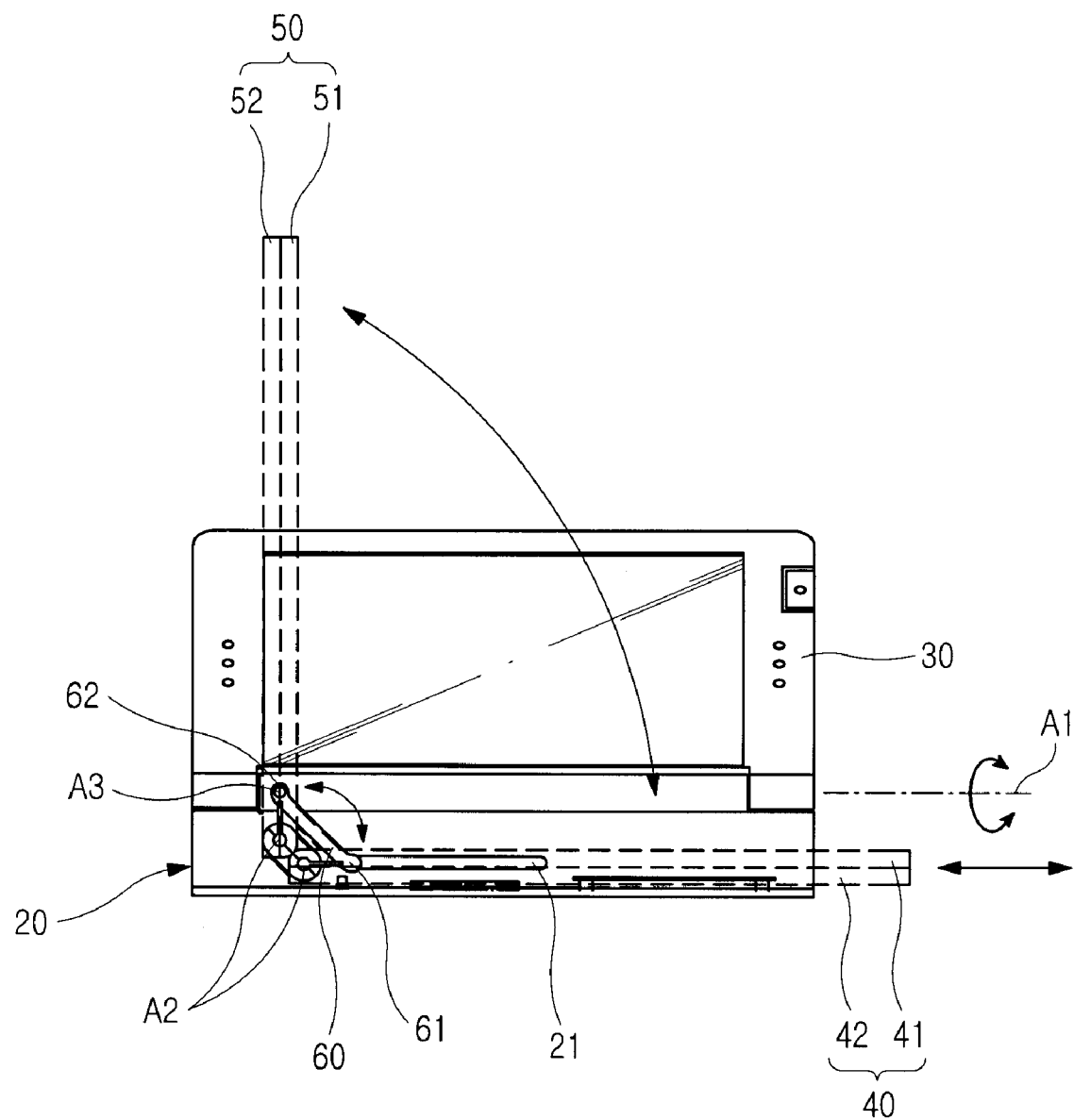
FIG. 9 is a front view showing the operating conditions of third and fourth housings of a multimedia portable electronic device according to an exemplary embodiment of the present invention.
Figure 10:
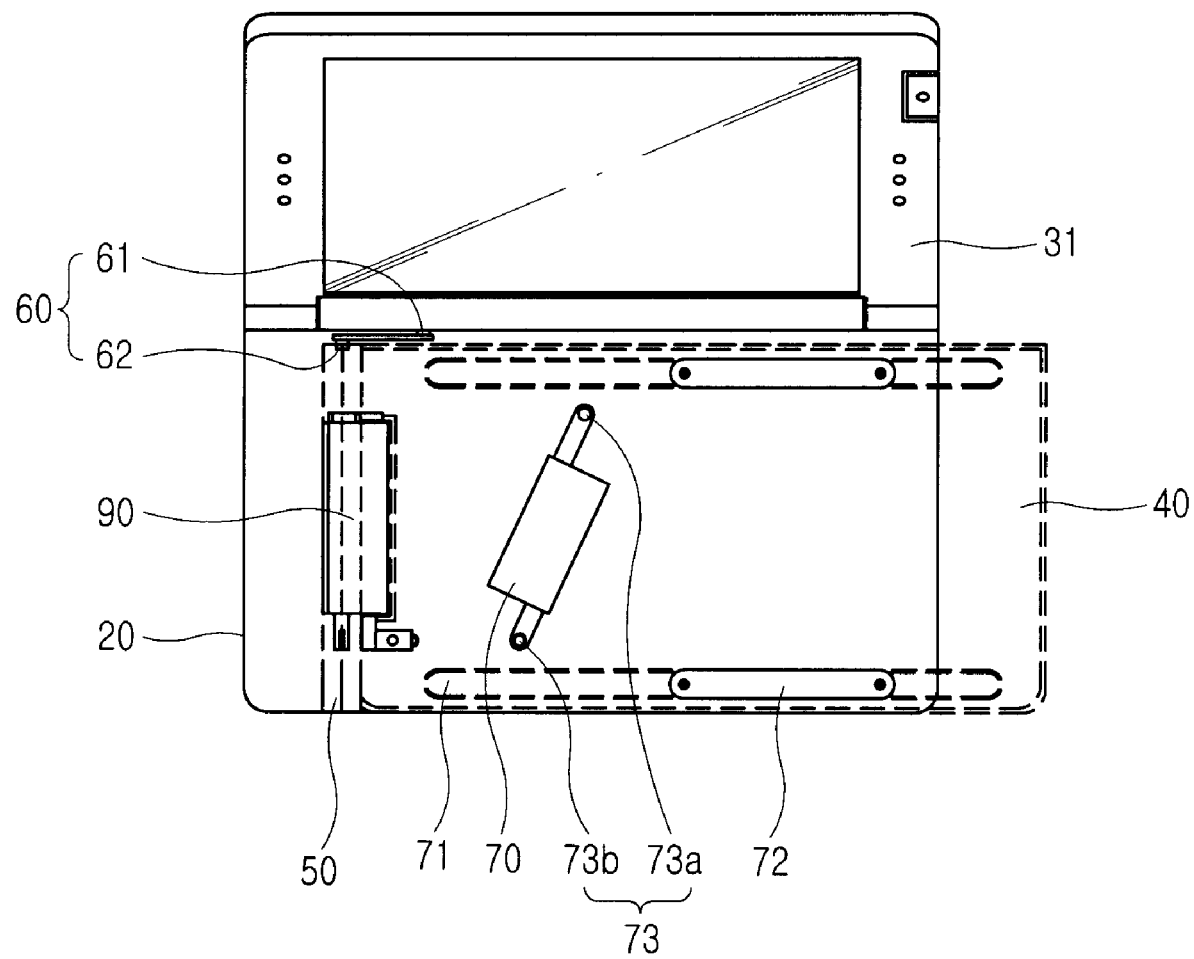
FIG. 10 is a top view showing the operating conditions of third and fourth housings of a multimedia portable electronic device according to an exemplary embodiment of the present invention.

If the fourth housing 50 is erected in a direction perpendicular to the longitudinal direction, as shown in FIG. 8, FIG. 9, and FIG. 10, the connection device 60 rotates about the third hinge axis A3. In addition, the fourth housing 50 rotates about the second hinge axis A2 of the second hinge unit 90, and the third housing 40 slides automatically.

Figure 12:
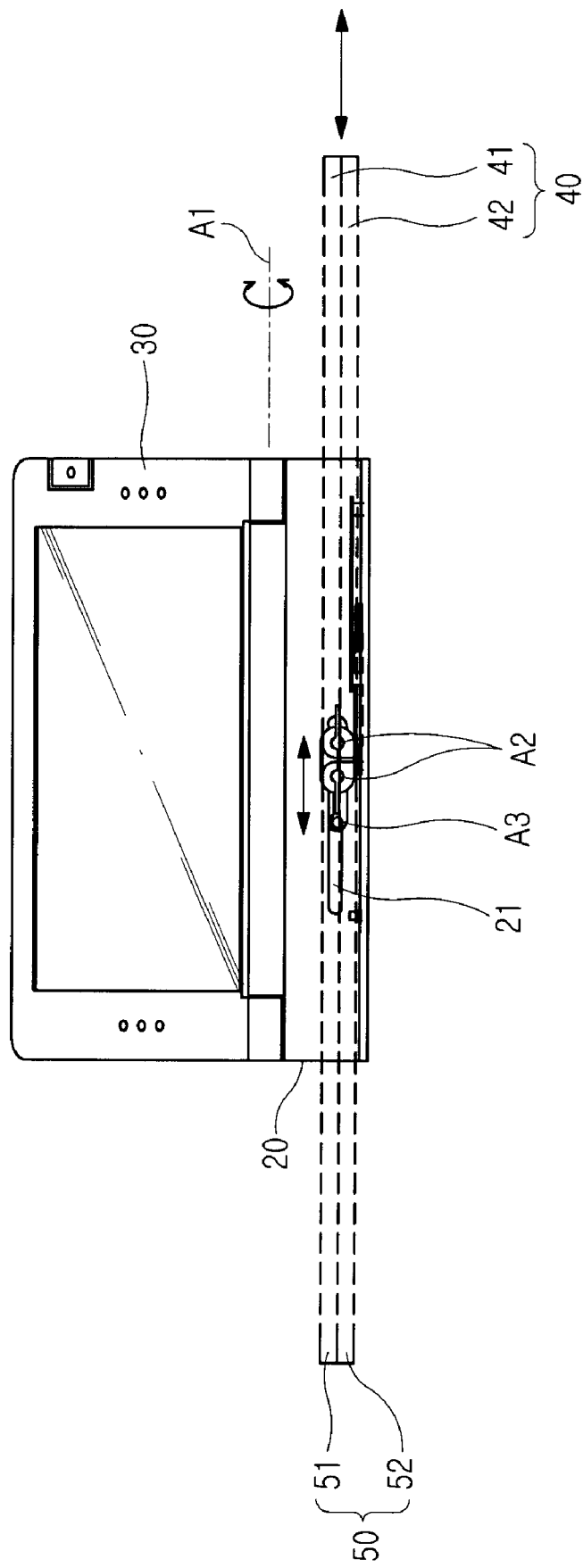
FIG. 12 is a front view showing the operating conditions of second, third, and fourth housings of a multimedia portable electronic device according to an exemplary embodiment of the present invention.
Figure 13:
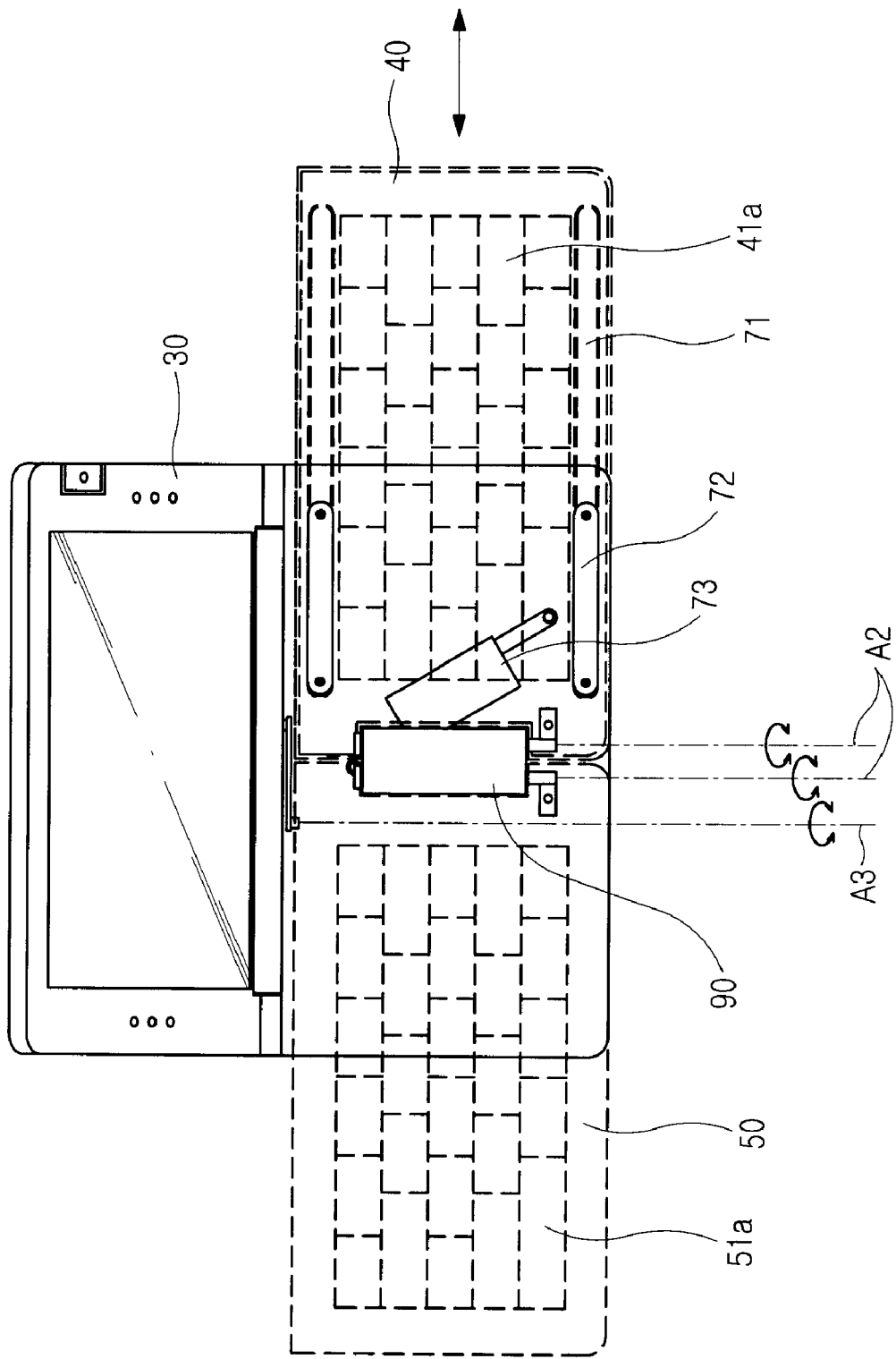
FIG. 13 is a top view showing the operating conditions of second, third, and fourth housings of a multimedia portable electronic device according to an exemplary embodiment of the present invention.

If the fourth housing 50 is rotated about the second and third hinge axes A2 and A3 to be extended, as shown in FIG. 11, FIG. 12, and FIG. 13, the third housing 40 slides semi-automatically due to the sliding device 70. At the same time, the fourth housing 50 unfolds in the longitudinal direction. The semi-automatic sliding movement of the third housing 40 is followed by a movement of the guide holes 71 of the sliding device 70. The guide holes 71 may slide along the guide fasteners 72, which support the guide holes 71 and guide their sliding movement.

The connection device 60 slides along the guide member 21 of the first housing 20, as shown in FIG. 8, FIG. 9, and FIG. 10. The guide member 21 may include a guide movement hole to guide the sliding movement of the connection device 60. The connection device 60 is adapted to unfold the fourth housing 50 about the second and third hinge axes A2 and A3 and to automatically slide the third housing 40. The force supply unit 73 between the first and third housings 20 and 40 provides a force necessary for semi-automatic movement of the third housing 40 when it slides more than a specific distance. The force supply unit 73 may include a push rod. One end of the push rod is configured as a first push rod 73a fastened to the upper portion of the first housing 20, and the other end is configured as a second push rod 73b fastened to the second case 42 of the third housing 40.

Figure 7:
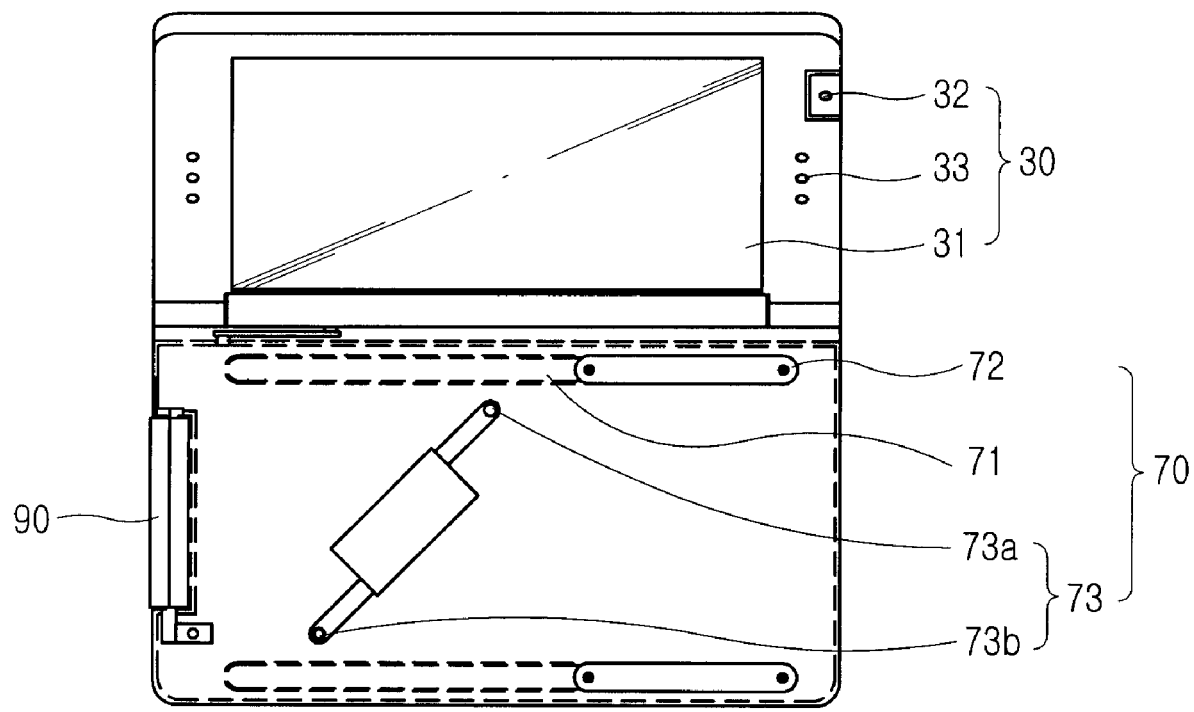
FIG. 7 is a top view showing a multimedia portable electronic device according to an exemplary embodiment of the present invention after a rotation of its second housing.

As shown in FIG. 7, FIG. 10, and FIG. 13, the first and second push rods 73a and 73b are arranged perpendicular to the sliding direction of the third housing 40 when they contract to the maximum extent. The first and second push rods 73a and 73b are arranged at an oblique angle to the sliding direction when they extend to the greatest extent. The third housing 40 is adapted to slide semi-automatically as the first and second push rods 73a and 73b contract/extend.

When the third and fourth housings 40 and 50 are arranged in a direction parallel to the longitudinal direction, as shown in FIG. 11, the first keypad 41a on the first case 41 of the third housing 40 is exposed, and so is the second keypad 51a on the first case 51 of the fourth housing 50. The user then can use the first and second keypads 41a and 51a as QWERTY keys.

If the user does not want to use the portable electronic device 10 in either the game mode or the QWERTY key mode, the fourth housing 50 may be rotated around the second and third hinge axes A2 and A3 so that it is erected in a direction perpendicular to the longitudinal direction, as shown in FIG. 4. The fourth housing 50 rotates to extend and fold so that the first case 51 of the fourth housing 50 faces the first case 41 of the third housing 40.

The second housing 30 may then rotate towards the fourth housing 50 about the first hinge axis A1 so that the second housing 30 and the fourth housing 50 face each other.

The second hinge unit 90 incorporates a reduction unit 100 to reduce the speed of rotation of the fourth housing 50.

The connection device 60 between the first and fourth housings 20 and 50 may include a link that is not exposed to the outside.

For example, the connection device may have a U-shaped or C-shaped configuration.

If the connection device 60 is long, it may be possible to open the fourth housing 50 and fully slide the third housing 40 without using the sliding device 70. However, a long connection device 60 may be exposed to the outside and therefore, may degrade the appearance. Furthermore, there is concern that the user's fingers may be hurt during use. Therefore, exemplary embodiments of the present invention shorten the connection device 60 and use a sliding device 70 adapted to fully slide the third housing 40 semi-automatically when the fourth housing 50 rotates. This minimizes the extent of exposure of the connection device 60 to the outside and prevents the user's fingers from being hurt during use.

The present invention is applicable to all types of portable electronic devices.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A multimedia portable electronic device, comprising:
    a first housing;
    a second housing coupled to the first housing so as to rotate about a first hinge axis;
    a third housing adapted to slide while facing the first housing;
    a fourth housing connected to the third housing so as to rotate about a second hinge axis to be folded/unfolded;
    a connection device positioned between the first housing and the fourth housing such that the connection device rotates about a third hinge axis, thereby causing the third housing to slide when the fourth housing is folded on or unfolded from the third housing;
    a sliding device positioned between the first housing and the third housing so that the third housing can slide; and
    a force supply unit positioned between the first housing and the third housing and facing the first housing and the third housing in a transverse direction so that the third housing is provided with a force necessary to slide.

2. The multimedia portable electronic device of claim 1, further comprising:
    a first hinge unit positioned on an upper portion of the first housing and on a side of the second housing so as to provide the first hinge axis extending in a longitudinal direction of the first housing and the second housing and to rotate the second housing toward or away from the first housing; and
    a second hinge unit positioned on a side of the third housing and the fourth housing so as to provide the second hinge axis extending in a direction perpendicular to the longitudinal direction and to fold the fourth housing on or unfold the fourth housing from the third housing.

3. The multimedia portable electronic device of claim 2, wherein the second hinge unit comprises a dual-axis hinge member comprising two hinge axes and a reduction unit to reduce a speed of rotation of the fourth housing.

4. The multimedia portable electronic device of claim 3, wherein the reduction unit comprises a plurality of meshing gears.

5. The multimedia portable device of claim 3, wherein the third housing rotates on one of the hinge axes of the dual-axis hinge member, and the fourth housing rotates on the other of the hinge axes of the dual-axis hinge member.

6. The multimedia portable electronic device of claim 1, wherein a first end of the connection device is coupled to the fourth housing so that the first end rotates together with the fourth housing when the fourth housing is folded or unfolded, and a second end of the connection device is coupled to a guide member of the first housing to guide a sliding movement of the third housing when the fourth housing rotates about the third hinge axis.

7. The multimedia portable electronic device of claim 6, wherein the guide member comprises a guide movement hole coupled to the connection device.

8. The multimedia portable electronic device of claim 1, wherein the connection device provides the third hinge axis extending parallel to the second hinge axis.

9. The multimedia portable electronic device of claim 1, wherein the connection device comprises a link made of a metallic material.

10. The multimedia portable device of claim 9, wherein the link is mounted inside all of the first housing, the second housing, the third housing, and the fourth housing.

11. The multimedia portable electronic device of claim 1, wherein the second housing comprises:
    a display unit mounted on an inner surface of the second housing.

12. The multimedia portable device of claim 11, wherein the second housing further comprises:
    a rotatable camera lens housing positioned adjacent to the display unit; and
    a speaker device positioned adjacent to the display unit.

13. The multimedia portable electronic device of claim 1, wherein the third housing comprises a first case and a second case, the first case comprising a first keypad having a number of keys arranged thereon, the second case comprising a pair of guide holes,
    wherein the fourth housing comprises a first case and a second case, the first case comprising a second keypad having a number of keys arranged thereon, the second case comprising a third keypad having a number of keys arranged thereon, and
    wherein the first keypad and the second keypad provide QWERTY keys when the fourth housing is rotated about the second hinge axis and the third hinge axis and when the third housing is unfolded and arranged in a direction parallel to a longitudinal direction of the first housing, and the third keypad comprises game-related keys.

14. The multimedia portable electronic device of claim 13, wherein the sliding device comprises:
    a pair of guide holes in the third housing; and
    a pair of guide fasteners inserted into the guide holes and coupled to the first housing, the guide fasteners supporting the third housing and guiding a sliding movement of the third housing.

15. The multimedia portable electronic device of claim 13, wherein the second housing is rotated away from the fourth housing about the first hinge axis so that the third keypad on the fourth housing is exposed when the portable electronic device is used in a game mode, and
    wherein the fourth housing is rotated about the second hinge axis and the third hinge axis and erected in a direction perpendicular to the longitudinal direction after the second housing is rotated, the third housing is slid by the connection device and the sliding device, the fourth housing is rotated about the second hinge axis and the third hinge axis to be unfolded in a direction parallel to the longitudinal direction, the third housing is slid by the connection device and the sliding device, the third housing and the fourth housing are arranged parallel to the longitudinal direction, and the first keypad and the second keypad are exposed to be used as QWERTY keys when the portable electronic device is used in a QWERTY key mode.

16. The multimedia portable electronic device of 1, wherein the force supply unit comprises a push rod, a first end of the push rod comprises a first push rod fastened to an upper portion of the first housing, a second end of the push rod comprises a second push rod fastened to the third housing, the first push rod and the second push rod being perpendicular to a sliding direction of the third housing when the first push rod and the second push rod contract to the greatest extent, and the first push rod and the second push rod being at an oblique angle to the sliding direction of the third housing when the first push rod and the second push rod extend to the greatest extent.

17. The multimedia portable device of claim 1, wherein the multimedia portable device is a DMB phone, a cellular phone, a PCS, a Personal Digital Assistant (PDA), or a Hand Held Phone (HHP).

18. The multimedia portable device of claim 1, wherein the connection device has a U-shaped configuration or C-shaped configuration.

* * * * *